United States Patent [19]

Bruun

[11] B 3,996,981

[45] Dec. 14, 1976

[54] TREE FELLING APPARATUS

[75] Inventor: Lars Öjvind Bruun, Filipstad, Sweden

[73] Assignee: Bruun System AB, Filipstad, Sweden

[22] Filed: Nov. 7, 1974

[21] Appl. No.: 521,793

[44] Published under the second Trial Voluntary Protest Program on February 24, 1976 as document No. B 521,793.

[30] Foreign Application Priority Data

Nov. 15, 1973 Sweden .............................. 7315516

[52] U.S. Cl. .............................. 144/34 R; 144/3 D; 83/928
[51] Int. Cl.² ........................................ A01G 23/08
[58] Field of Search .................. 144/2.2, 3 D, 34 R, 144/34 E, 309 AC; 83/928

[56] References Cited

UNITED STATES PATENTS

| 3,527,272 | 9/1970 | Hamilton | 144/3 D |
| 3,640,322 | 2/1972 | Allen | 144/3 D X |
| 3,854,510 | 12/1974 | Matlik | 144/34 R |

FOREIGN PATENTS OR APPLICATIONS

| 330,602 | 11/1970 | Sweden | 144/309 AC |

Primary Examiner—Travis S. McGehee
Assistant Examiner—W. D. Bray
Attorney, Agent, or Firm—Plumley and Tyner

[57] ABSTRACT

A preferably tractor-mounted tree felling apparatus comprising two saw chains on guide bars arranged to be moved towards one another to cut through the tree while the latter is gripped by gripping jaws. The two saw chains are arranged to move in the same direction at the tree trunk center with the teeth of the chains somewhat in displaced relation to enable the teeth of one chain to run closely to the teeth of the second chain for improved cutting action.

6 Claims, 4 Drawing Figures

TREE FELLING APPARATUS

BACKGROUND OF THE INVENTION

To cut trees it is known to use cutting machines mounted on tractors and incorporating hydraulically operated shears the legs of which cut through the tree trunk. This cutting method gives extensive damage on the tree trunk. To avoid such damage, the use of chain saws has been suggested, the chain saws being mounted on the tractor in a manner permitting the guide bars to move towards another in a horizontal plane. Hitherto known machines of this kind suffer, however, from two considerable disadvantages, via, the readiness of the chain saws to become stuck in the kerf whereby not only the chains are damaged or torn away but in addition the guide bars are bent in the attempts to remove the saw from the tree, and also the difficulty in sawing through the entire tree as it is not possible to make the two saw chains run closely adjacent one another in the tree centre.

SUMMARY OF THE INVENTION

The tree felling apparatus in accordance with the present invention remedies the above-mentioned drawbacks. More precisely the invention relates to an apparatus of the kind comprising two saw bows arranged for movement towards and away from one another in a stand and each one provided with a guide bar and a continuous saw chain running around the bar in the horizontal plane of the latter, and also at least one pair of gripping arms pivotally mounted at a higher level in the stand so as to grip the tree trunk, both saw chains being arranged to be driven in synchrony during the movement of the saw bows towards one another to sever the tree trunk. It is characteristic of the invention that the apparatus includes means for mechanical guidance of the movements of the saw bows as well as those of the gripping arms relative to an imaginary vertical longitudinal medium plane through the apparatus. The synchronous drive of the two saw chains and the forced motion of the pivotal movements of the saw bows ensure not only that the saw chains always meet at the centre of the tree but also — which is possible through the displacement by one half saw tooth pitch of one of the saw chains relative to the second one — that the cutting teeth of one saw chain the kerf will run directly opposite the gap or space between two cutting teeth in the other saw chain. Consequently, the saw bows are allowed to swing sufficiently far towards one another for the teeth of one saw chain to even engage in the gap between the cutting teeth of the second chain. As a result, the tree is cut all the way through.

In accordance with a suitable embodiment of the invention the guide bars are thicker than the cutting teeth and positioned opposite its respective saw chain. This ensures that the guide bars are pressed into the kerf through wedging. Clamping of the saw chains in the kerf is hereby avoided.

BRIEF DESCRIPTION OF THE DRAWINGS

Further characteristics of the invention will become apparent upon reading of the following description with reference to the accompanying drawings, wherein

FIG. 4 is a plan view on an enlarged scale of a portion of the saw chains in working position in accordance with FIG. 2.

DETAILED DESCRIPTION OF A PREFERRED EMBODIMENT

Figure 1:
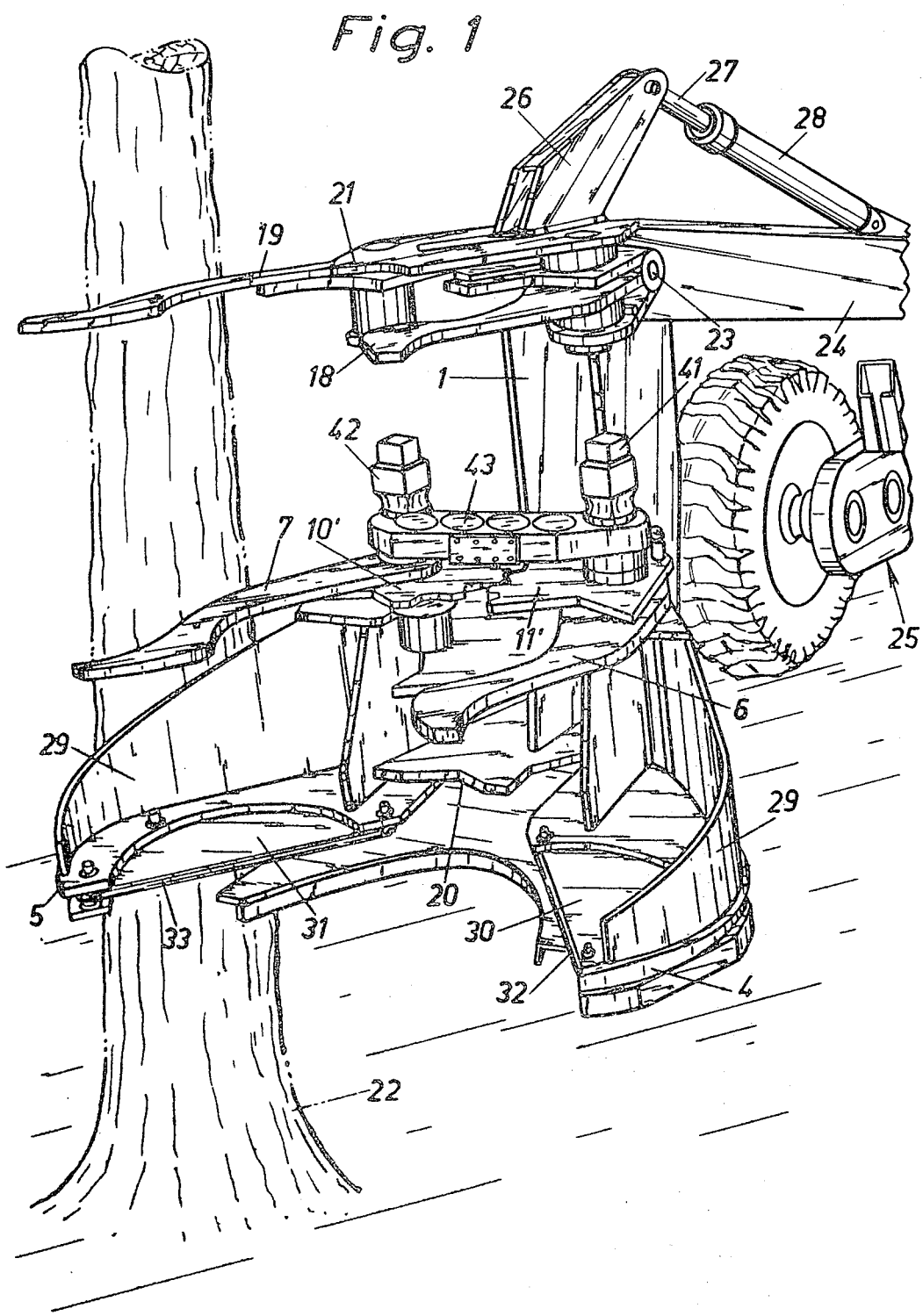
FIG. 1 is a perspective view as seen obliquely from above and from the front of a tree felling apparatus in accordance with the invention.
Figure 2:
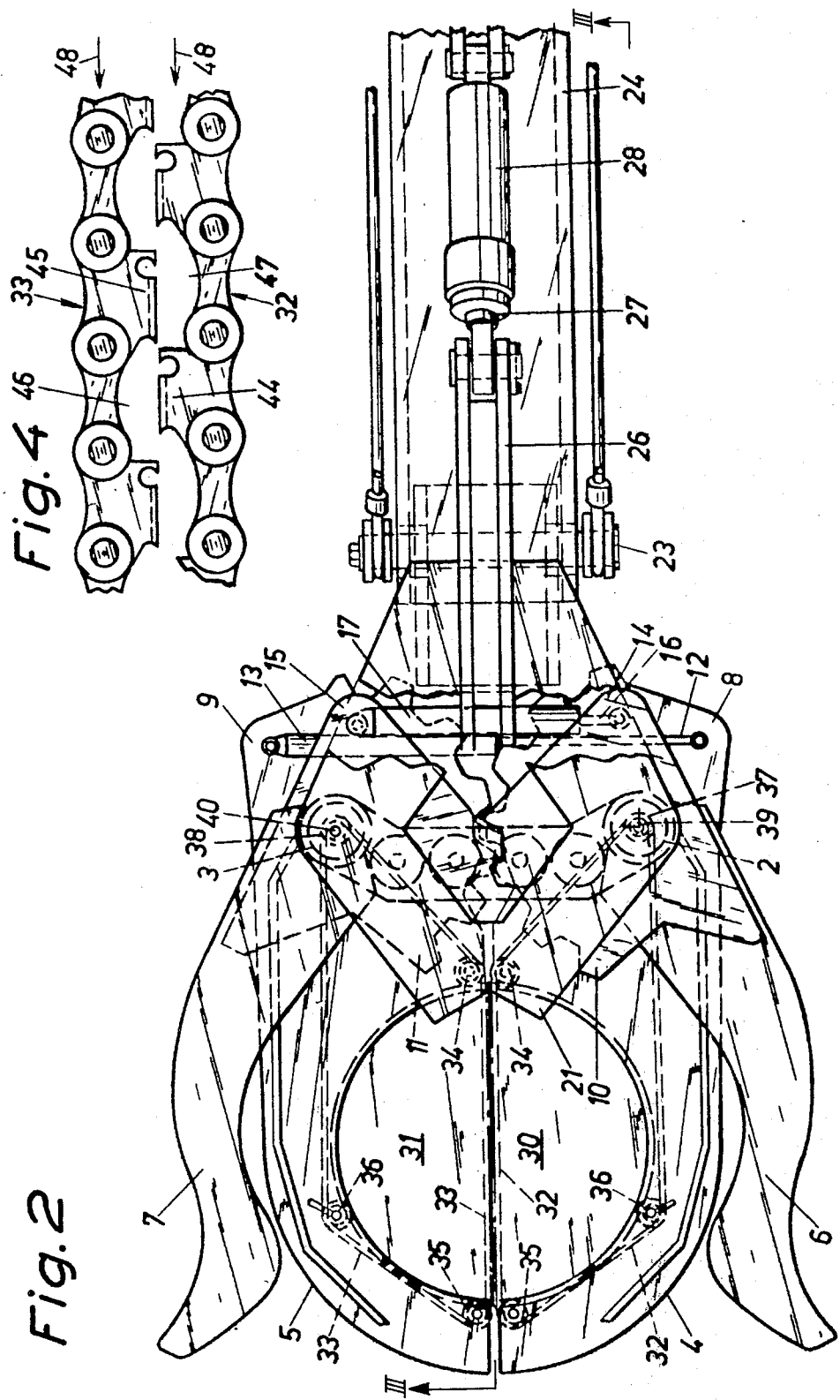
FIG. 2 is a plan view of the same apparatus.
Figure 3:
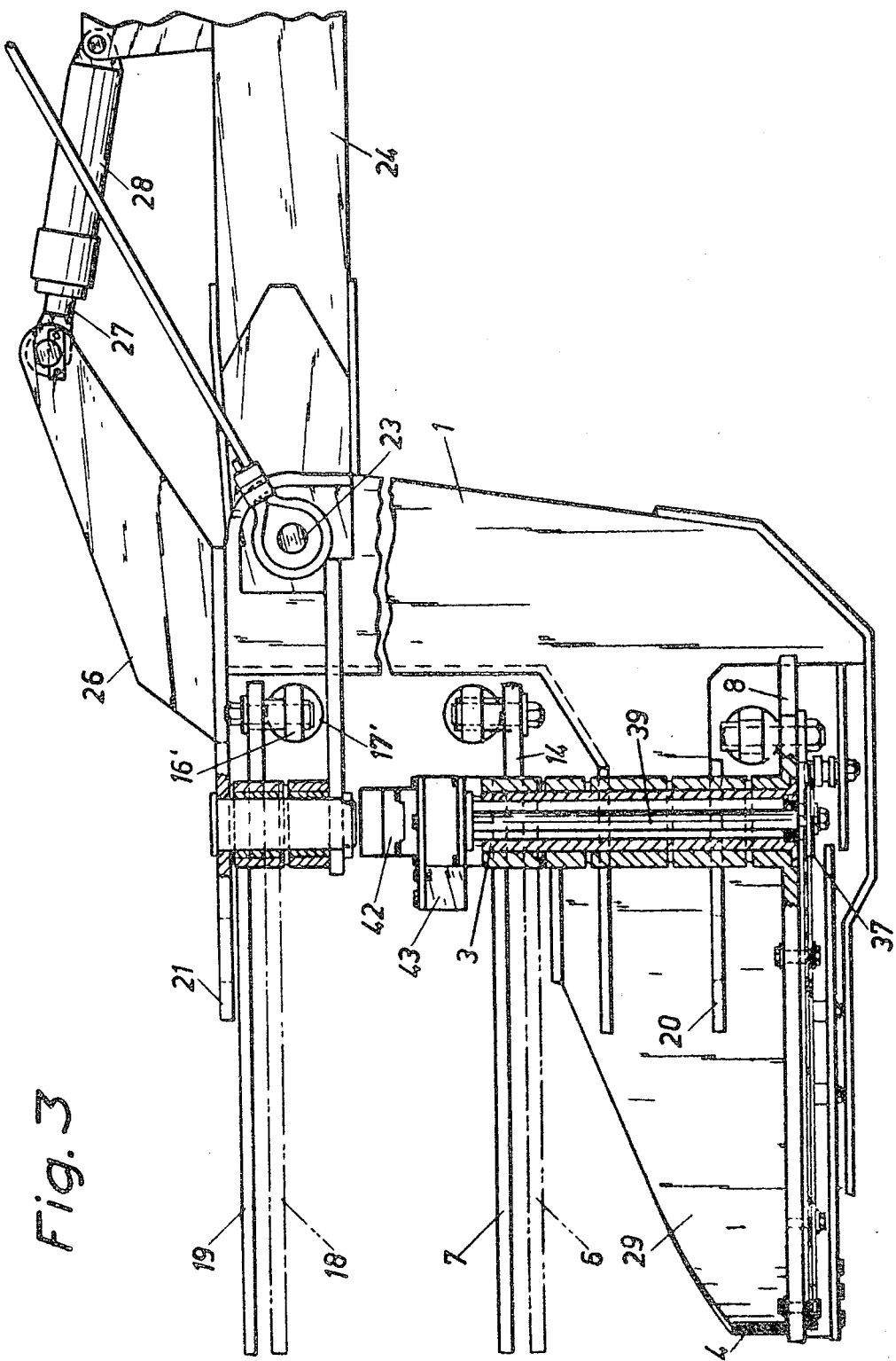
FIG. 3 shows a vertical longitudinal section through the apparatus along Line III—III of FIG. 2.

On the stand 1 of the tree felling apparatus are pivotally mounted two cutting bows 4,5 for swinging motion about two vertical shafts 2 and 3, respectively, together with two gripping arms 6 and 7. Each cutting bow 4, 5 is provided with a rearwardly directed arm 8, 9 respectively, and with a sprocket wheel segment 10, 11 the sprockets of which interengage. Between the rearwardly directed arms 8 and 9 is inserted a hydraulic piston-and-cylinder unit 12, 13 by means of which the cutting bows 4, 5 may be mechanically guided so as to swing towards and away from each other. Also the gripping arms 6, 7 are provided with one rearwardly directed arm 14, 15 each between which arms a hydraulically operated piston-and-cylinder unit 16, 17 is arranged. Also the gripping arms are provided with mutually cooperative sprocket wheel segments 10', 11', an arrangement which provides for guided motion of the gripping arms 6, 7 towards and away from each other in a horizontal plane. An additional pair of gripping arms 18, 19 is in a similar manner as arm pairs 6, 7 arranged for guided swinging motion in a horizontal plane towards and away from each other by means of a hydraulic piston-and-cylinder unit 16', 17'. Swinging motion of the saw bows 4,5 and the gripping arms 6, 7 as well as gripping arms 18, 19 is performed in symmetry relative to an imaginary vertical longitudinal medium plane through the apparatus. In this longitudinal medium plane the stand 1 is provided with two superposed supports 20,21 for the tree 22 to be cut.

The stand 1 is pivotally mounted about a horizontal shaft 23 at the forward end of a boom 24 which is mounted on a tractor 25 for pivotal movement in a vertical plane. Above the shaft 23 extends upwards a frame arm 26 between which arm and the boom 24 is mounted a hydraulic piston-and-cylinder unit 27, 28. By means of this unit the entire stand 1 together with the saw bows 4, 5 and the gripping arms 6, 7 and 18, 19 may be swung in a vertical plane in such a manner that the free ends of the bows and the gripping arms become directed downwards.

In the saw bows 4, 5 which are provided with powerful reinforcement flanges 29 are inserted two essentially semicircular guide bars 30, 31 arranged in such a way that when the saw bows 4, 5 are in position of contact with each other, the bars form a substantially circular surface. Around each guide bar 30, 31 runs a saw chain 32, 33 over sprocket wheels 34, 35, and 36, and the chains also run over one drive wheel 37 and 38 each. The drive wheels 37, 38 are arranged at the lower end of their respective shaft 39, 40, these shafts being driven from their respective hydraulic motor 41, 42 via a gear box 43 in a manner permitting the two saw chains 32, 33 to run in synchrony and in the same direction at the centre of the apparatus. As illustrated in FIG. 4 the cutting teeth 44, 45 of the two saw chains 32, 33 are positioned opposite a tooth gap 46, 47 in the opposite saw chain. As the saw chains 32, 33 run in synchrony and in the same direction, see the arrows 48 in FIG. 4, there is no risk that the teeth, 44, 45 will damage one another during operation, not even if the teeth of the saw chains 32, 33 should engage somewhat.

The guide bars 30, 31 are a little thicker than the cutting teeth 44, 45 — e.g. by one or a few millimeters — and are positioned in the same plane as the saw chains 32, 33.

Tree felling with the use of the machine in accordance with the invention takes place in the following manner. With the aid of the tractor 25, the apparatus is driven with the saw bows 4, 5 as well as the gripping arms 6, 7 and 18, 19 apart in a direction towards the tree 22 to be cut until the supports 20, 21 press against the tree. Because the supports 20, 21, as appears from the drawings, have a V-shaped front edge a certain centering of the apparatus relative to the tree 22 is achieved. The hydraulic piston-and-cylinder units 16, 17 and 16', 17' swing the gripping arms 6, 7 and 18, 19 inwards towards the tree, the arms gripping the tree between themselves and the supports 20, 21. The hydraulic piston-and-cylinder unit 12, 13 thereafter swings the saw bows 4, 5 towards one another while the saw chains are driven by the hydraulic motors 41, 42 via the gear box 43. The saw chains 32, 33 then cut the tree, the lower end of which will rest freely on the guide bars 30, 31 and be supported thereby. The boom 24 raises the entire apparatus together with the cut tree 22 and the hydraulic piston-and-cylinder unit 27, 28 will then swing the stand 1 together with saw bows 4, 5, the gripping arms 6, 7 and 18, 19 as well as the entire tree 22 so as to position the tree on the ground at the desired place.

The embodiment as shown and described is to be regarded as an example only and the various details of the tree felling apparatus may be constructively altered in a variety of ways within the scope of the appended claims. Instead of sprocket wheel segments 10, 11 it is possible to arrange for guided motion of the saw bows 4, 5 and the gripping arms 6, 7 and 18, 19 through the means, e.g. through link arms which in a suitable manner are articulated to the bows and the individual arms of each pair. The upper pair of gripping arms 18, 19 may be dispensed with.

What I claim is:

1. An improved tree felling apparatus comprising two saw supports on a supporting member and arranged for swinging motion towards and away from one another, one guide bar on each saw support, a continuous saw chain supported on each guide bar so as to run around it in the horizontal plane of said bar, and at least one pair of gripping arms pivotally mounted in the apparatus (at a higher level) and adapted to grip a tree trunk, said two saw chains arranged to be driven in synchrony, while said saw supports approach one another, to cut said tree trunk, the improvement comprising single means incorporated in said apparatus to mechanically control the movement of each of said saw supports as well as those of said gripping arms relative to an imaginary vertical longitudinal medium plane through said apparatus.

2. An improved tree felling apparatus as claimed in claim 1, the improvement comprising a sprocket segment on each one of said saw supports, said two sprocket segments arranged for interengagement, a rearwardly directed arm on each saw support and a hydraulic piston-and-cylinder unit inserted between said rearwardly directed arms.

3. An improved tree felling apparatus as claimed in claim 1, the improvement comprising a sprocket segment on each one of said gripping arms, said two sprocket segments arranged for interengagement, a rearwardly directed arm on each one of said gripping arms, and a hydraulic piston-and-cylinder unit inserted between said rearwardly directed arms.

4. An improved tree felling apparatus as claimed in claim 1, the improvement comprising a second pair of gripping arms positioned in said apparatus at a higher level than said first pair of gripping arms and mechanically guided to control their movements relative to a support on said apparatus.

5. An improved tree felling apparatus as claimed in claim 1, wherein said guide bars are thicker than the teeth of said saw chains, said bars located opposite their respective one of said saw chains.

6. An improved tree felling apparatus as claimed in claim 1, the apparatus mounted on a vehicle, a hoisting boom on said vehicle, said tree felling apparatus supported on the outer end of said vehicle hoisting boom, the improvement comprising arranging said apparatus together with said saw supports and said gripping arms for swinging motion from the operative position in a vertical plane coinciding with the longitudinal axis of said boom, in such a manner as to direct the free ends of said saw supports and said gripping arms in a downwards direction.

* * * * *